United States Patent Office 2,971,853
Patented Feb. 14, 1961

2,971,853

CERAMIC BODY AND METHOD OF MAKING IT

Stanley D. Stookey, Corning, N.Y., assignor to Corning Glass Works, Corning, N.Y., a corporation of New York No Drawing. Filed Nov. 19, 1959, Ser. No. 854,028

28 Claims. (Cl. 106—52)

This invention relates to a novel ceramic body of high mechanical strength containing one or more crystalline silicates with or without quartz, and to a novel method of making such bodies in intricate shapes with accurate dimensions.

This application is a continuation in part of my pending application Serial No. 538,510 filed October 4, 1955, and now abandoned which in turn was a continuation-in-part of its co-pending application Serial No. 340,652 filed March 5, 1953 and now abandoned.

The shape and accuracy with which a sintered ceramic article can be formed by molding and firing it in the conventional manner are limited by the shape of the mold and the accuracy of the estimated allowance for change in dimensions due to the drying and firing shrinkage of the molded article. Filigreed articles are particularly difficult and unsatisfactory to make by conventional sintering methods.

Sintered ceramic bodies and particularly sintered filigreed ceramic articles also have relatively low mechanical breaking strength. Moreover, sintered bodies containing substantial amounts of quartz are subject to thermal breakage on being cooled from the firing temperatures as a result of the inversion of the high-temperature crystalline form of quartz to the low-temperature crystalline form which is accompanied by a change in volume and in thermal expansion coefficient.

I have now discovered that a completely opacified glass body initially formed of certain photothermally opacifiable glasses can, by treatment in accordance with the methods hereinafter described, be converted without substantial change of size or shape to an essentially crystalline ceramic body in which crystalline silicates and, in some cases, high-temperature quartz can be identified by X-ray analysis at ordinary temperatures, the inversion of the quartz, which would be expected to take place upon cooling the heated body to room temperature, apparently not having occurred. Such ceramic bodies melt relatively sharply at temperatures considerably above the softening points of the original glasses and their mechanical breaking strengths are surprisingly higher than those of the original glasses.

The thermal expansion coefficient of the crystalline product is normally substantially different from that of the original glass and on account of such incompatible expansivity the articles should be opacified throughout before being converted to the crystalline product. However, I have found that an article of such convertible glass can, if desired, first be selectively etched or sculptured by selective exposure of a portion of the body followed by development and dissolution of the exposed and opacified portion of the article in accordance with the process described and claimed in my Patent 2,628,160 and that such sculptured glass article can thereafter be completely photothermally opacified and then converted to the above-mentioned crystalline body.

Broadly the invention in its preferred embodiment comprises providing a shaped article of a photothermally opacifiable glass consisting essentially by weight of 60–85% $SiO_2$, 5.5–15% $Li_2O$, 2–25% $Al_2O_3$, the weight ratio of $Al_2O_3/Li_2O$ being less than about 1.7/1, and the indicated proportion of a photosensitive metal selected from the group consisting of about 0.001–0.03% of gold computed as Au, about 0.001–0.3% of silver computed as AgCl, and about 0.001–1% of copper computed as $Cu_2O$, the above constituents totalling at least 90%, exposing the article to short-wave radiations, advantageously ultraviolet radiations, heating the exposed article above the annealing point but below the softening point of the glass until siliceous crystallites, including lithium metasilicate, are formed therein in an amount sufficient to provide a crystalline structure which is rigid enough to prevent distortion of the article by softening of its glassy matrix, and finally heating the article above the softening point of the original glass and above 800° C. without altering its shape, but not above about 950° C., to cause further crystallization, including conversion of at least some of the lithium metasilicate to a lithium-containing silicate having a lower weight percentage of lithium than the metasilicate. (By annealing point is meant that temperature at which the viscosity of the glass is $10^{13.4}$ poises and by softening point is meant that temperature at which the viscosity is $10^{7.6}$ poises.)

So as to increase the photosensitivity of the glass, $CeO_2$ in an amount not exceeding about 0.05% may, if desired, be included therein. Amounts larger than this, however, absorb the short-wave radiations at the surface of the glass and seriously diminish the effectiveness of the exposure. Small amounts of $SnO_2$, not exceeding about 0.02%, also facilitate the formation of nuclei of the photosensitive metal, particularly of copper and silver.

So as to aid in melting of the glass composition, other alkali metal oxides such as $Na_2O$ and $K_2O$ may be incorporated in the glass batch in addition to the $Li_2O$. However, as $Na_2O$ and $K_2O$ are not removed from the amorphous or glass phase by the subsequent crystallization process, they decrease the total crystalline content of the resulting body and remain in the glass phase, along with any $Li_2O$ which has not been crystallized. Therefore, no more than 4% of either $Na_2O$ or $K_2O$ should be included in the original glass composition and the total alkali metal oxide should not exceed 19% of the original glass composition.

For the purpose of shaping the article by selectively etching or sculpturing it by the method described and claimed in my Patent No. 2,628,160, the glass composition desirably consists essentially of 75–85% $SiO_2$, the indicated proportion of an alkali metal oxide selected from the group consisting of 9–15% $Li_2O$, 0–4% $Na_2O$, 0–4% $K_2O$, the selected alkali metal oxide including at least 9% $Li_2O$, the total alkali metal oxide being between 9% and 19%, 2–10% $Al_2O_3$, and either about 0.001–0.03% of gold computed as Au, or .001–0.3% of silver computed as AgCl, or about 0.001–1% of copper computed as $Cu_2O$, the above constituents totalling at least 94%.

Particularly suitable within such range are those compositions, consisting essentially of 78–83% $SiO_2$, the indicated proportion of an alkali metal oxide selected from the group consisting of 10–13% $Li_2O$, 0–4% $Na_2O$, 0–4% $K_2O$, the selected alkali metal oxide including at least 10% $Li_2O$, the total of the alkali metal oxides being between 10% and 17%, 4–10% $Al_2O_3$, and either about 0.001–0.03% of gold computed as Au, or about 0.001–0.3% (advantageously 0.001–0.020%) of silver computed as AgCl, or about 0.001–1% of copper computed as $Cu_2O$, the above constituents totalling at least 94%, and $CeO_2$ in an amount not exceeding about 0.05%.

In addition to the non-essential constituents, Na₂O and K₂O, there may be added to the above compositions a small amount, not exceeding a total of 6%, of other metal oxides, which do not materially change the fundamental character of the glass but which function as fining agents, fluxes, or stabilizers, such as $Sb_2O_3$, $As_2O_3$, $B_2O_3$, and oxides of metals of the second periodic group, particularly ZnO. The non-essential constituents tend to increase the amount of glassy matrix and to soften the same and, therefore, should not total more than 10%.

The following compositions, calculated from their batches to the oxide basis in parts by weight, are examples of glasses which are suitable for carrying out the new process. (The amounts of the photosensitive metals and of the $CeO_2$ and $SnO_2$, being less than one, are necessarily expressed as decimals to two or three significant places; but such practice is without significance in expressing the major constituents. Since each composition totals approximately 100, the amounts given for the various constituents thereof can for practical purposes be called percent by weight.)

TABLE

|  | 1 | 2 | 3 | 4 | 5 | 6 |
|---|---|---|---|---|---|---|
| $SiO_2$ | 80 | 81 | 81 | 77.5 | 81.5 | 80 |
| $Li_2O$ | 12.5 | 12.5 | 12.5 | 12.5 | 6.5 | 8.5 |
| $Na_2O$ |  |  |  |  | 4 | 4 |
| $K_2O$ | 2.5 | 2.5 | 2.5 |  |  |  |
| $Al_2O_3$ | 4 | 4 | 4 | 10 | 8 | 7.5 |
| ZnO | 1 |  |  |  |  |  |
| $CeO_2$ | 0.03 | 0.03 | 0.3 | 0.02 | 0.03 | 0.03 |
| Au | 0.003 | 0.018 | 0.027 |  |  |  |
| AgCl |  |  |  | 0.002 | 0.006 | 0.006 |
| Soft. Pt., °C | 634 | 620 | 620 | 661 | 668 | 667 |
| Ann. Pt., °C | 457 | 461 | 461 | 482 | 489 | 470 |

|  | 7 | 8 | 9 | 10 | 11 | 12 |
|---|---|---|---|---|---|---|
| $SiO_2$ | 80.8 | 80.8 | 80 | 73.5 | 65 | 79.8 |
| $Li_2O$ | 12.4 | 12.4 | 12.5 | 12.5 | 15 | 10.2 |
| $K_2O$ | 2.5 | 2.5 | 2.5 |  |  | 5 |
| $Al_2O_3$ | 4 | 4 | 4 | 10 | 20 | 4 |
| ZnO |  |  | 1 |  |  | 1 |
| $CeO_2$ | 0.025 | 0.025 | 0.03 |  | 0.03 | 0.012 |
| $SnO_2$ | 0.015 | 0.015 | 0.01 | 0.01 | 0.01 |  |
| Au |  |  |  |  |  | 0.001 |
| AgCl | 0.18 | .27 |  |  |  | 0.16 |
| $Cu_2O$ |  |  | 0.003 | 0.1 | 0.8 |  |
| Soft. Pt., °C | 620 | 620 | 634 | 629 | 675 | 660 |
| Ann. Pt., °C | 461 | 461 | 457 | 457 | 510 | 463 |

The compositions shown in the above table were melted for about 3 to 4 hours at 1350° C.–1400° C. in open crucibles each having a capacity of about 1 pound of glass. The gold-containing glasses of the Examples 1, 2, and 3, as is the usual practice, were melted under neutral or oxidizing conditions. The silver-containing glasses of Examples 4, 5, and 6 were melted under reducing conditions in accordance with the method of my prior Patent No. 2,684,911, and the silver-containing glasses of Examples 7, 8, and 12 were melted under neutral or oxidizing conditions as is the practice with photosensitive glasses of such higher silver content. As is customary with glasses in which the photosensitive metal is copper, the glasses of Examples 9, 10, and 11 were melted under reducing conditions.

Where a glass is to be melted under oxidizing conditions, it may be desirable to include a small amount of an oxidizing agent in the batch. On the other hand, where a glass is to be melted under reducing conditions, it is the usual practice to add a reducing agent such as starch or $NH_4Cl$ to the batch. The amount of reducing agent which is required in such latter case will vary with the conditions under which the glass is melted, that is, with the size and type of melting container (whether open crucible, closed pot or tank) and with the time and temperature of melting. It is therefore not possible to specify the amount of reducing agent which should be used under all conditions. However, the proper amount for any particular composition and melting conditions can readily be determined by trial.

The stated limiting proportions of the individual essential constituents define the maximum range of compositions which have photosensitive characteristics and which can be converted by the instant procedure to a crystalline ceramic condition. However, compositions in which the weight ratio $Al_2O_3/Li_2O$ is greater than 1.7/1 are not photosensitive. The indicated maximum proportions of the photosensitive metals gold, silver, and copper represent the practicable upper limits of such metals. Still larger amounts of these photosensitive metals can be used but are quite unnecessary since the excess metal will separate and precipitate out and will color the glassy matrix. In the case of gold at least, the presence of any such excess is also needless expense. Amounts less than the indicated minimum quantities are substantially ineffective to make the glass photosensitive.

For producing ceramic articles in accordance with the preferred method of my invention, a glass of the desired composition, as described above, is melted and shaped to desired form by one of the conventional glass-forming processes including pressing, blowing, rolling, drawing or attenuation into fibers. If further hot-working of the glass is necessary to produce the desired article, as for example sealing a piece of tubing to a hollow glass article or sagging a flat sheet to desired curvature, such operations should be performed prior to irradiation and subsequent heat treatment. The finished glass article, whether pressed or blown glassware, tubing, rod, flat glass or fibrous glass, can then be converted to the corresponding crystalline ceramic article by the above-described process without substantial change of size or shape.

Articles can also be formed by pulverizing the glass, slip-casting or otherwise molding the powdered glass and thereafter sintering the molded article. Such an article can then be photothermally opacified and converted to the crystalline state by final heat-treatment at a temperature above the softening point as described above. While the mechanical strength of such molded article is less than that of an article formed and shaped by the method just referred to, it is upwards of four times greater than that of a similar article formed by only molding and sintering powdered glass in accordance with conventional practice.

Moreover, by means of the process described and claimed in my Patent No. 2,628,160, an article composed of the glass referred to above can be formed with photographic fidelity into any desired shape including a relief, intaglio, filigree or the like design, or other shapes heretofore either impossible to achieve or requiring long and laborious mechanical grinding; and such shaped article can thereafter be converted to a crystalline body without change of size or shape as indicated above.

In carrying out the method of the present invention, the glass article is photothermally opacified by being first exposed to short-wave radiations and thereafter heated to a temperature between the annealing point and the softening point of the glass, to opacify it by the formation of crystallites of lithium metasilicate. The initiation of such crystallization depends upon the preliminary formation throughout the glass of submicroscopic particles of gold, silver, or copper, as the case may be, as nuclei or centers of crystallization. While such nuclei will to some extent be formed by long continued heating of the glass at temperatures below the annealing point, they are formed with more practicable rapidity at temperatures somewhat above the annealing point and particularly between about 500° C. and 600° C. The preferred heat-treatment for the formation of the nuclei of the photosensitive metals comprises heating the exposed article for at least 2 minutes in the neighborhood of 520° C., that is, between 500° C. and 540° C. However, another nucleation step which is of particular utility in a continuous-type operation, comprises heating the exposed articles from 500° C. to 600° C. at a rate not exceeding 5° C., per minute. In any event, if the rate of increase of temperature to the neighborhood of 520° C. and past 600° C. is too rapid, nucleation and opacification will not occur and the desired subsequent crystallization cannot be brought about.

However, once the article has been heated at a temperature between 500° C. and 600° C. for a sufficient time to form nuclei of the photosensitive metal contained therein, the temperature may be raised to a temperature above 600° C. and below the softening point of the glass at as high a rate as desired so long as such rate does not cause shattering of the article from severe thermal gradients within the article.

To convert the glass article into a crystalline ceramic body in accordance with the invention, it is necessary to heat the article above the softening point of the original glass. To avoid deformation during such final heat-treatment, however, it is essential that the crystals formed as a result of the heat-developed opacification of the exposed article shall be so numerous and in such close juxtaposition as to provide a rigid structure which will support the article against deformation even though its glassy matrix may be softened. The time required for the formation of such self-supporting crystalline structure in the glass is proportional to the viscosity of the glass and decreases as the viscosity decreases and, therefore, as the temperature is increased. For instance about 20 hours is required to form such crystalline structure if the temperature is maintained at 520° C., but only one hour is required at a temperature about 50° C. below the softening point of the glass and only about 10 to 20 minutes at a temperature just below the softening point. The desired result may also be obtained by raising the temperature at a rate perferably not faster than about 5° C. per minute between 520° C. and the softening point of the glass. Preferably, however, the temperature is raised somewhat more rapidly, after the nucleation step, to a temperature about 50° C. below the softening point; and the article is then heated for about 20 to 60 minutes between the softening point, and 50° C. below the softening point of the glass.

I have found the kind of crystal which is formed during such preliminary heat treatments depends upon the composition of the glass and that the presence of $K_2O$ in the glass favors the formation of lithium metasilicate, while the presence of $Na_2O$ favors the formation of lithium disilicate. X-ray examination of articles of various compositions at various stages of heat treatment indicates that during the preliminary heat treatments all of the lithium in the glass is precipitated initially as lithium metasilicate, particularly if the glass contains more than about 3% $K_2O$, less than about 80% $SiO_2$ and less than about 5% $Al_2O_3$; that lithium disilicate crystals also form if the silica is above about 80%, $K_2O$ is less than about 3% and $Al_2O_3$ is less than about 5%; and that crystals of beta-spodumene may also form if $Al_2O_3$ is above 5%. Although not proved, it is believed that lithium disilicate and the beta-spodumene are formed by reaction of the initially precipitated lithium metasilicate with the $SiO_2$ and $Al_2O_3$ of the glass.

The conversion of the photothermally opacified article to an essentially crystalline ceramic body is effected by finally heating the opacified article above the softening point of the original glass and above 800° C. but not above about 950° C. During such heating, residual lithium metasilicate crystals, previously formed, are converted to lithium disilicate crystals and, if the $Al_2O_3$ content of the glass is 8–10% and if the $SiO_2$ is sufficient, to beta-spodumene also. Quartz also is formed, if the $SiO_2$ content of the glass is upwards of 80%. The glassy matrix comprises the non-essential constituents including $K_2O$ and $Na_2O$ together with the residual $SiO_2$ and $Al_2O_3$.

Advantageously, in the preferred embodiment of the invention, such final heating is carried out to accomplish maximum conversion of the opacified glass to the crystalline ceramic state, and the resulting ceramic body possesses unusual mechanical strength and abrasion resistance and very desirable electrical properties. The time required for such maximum conversion varies with the temperature at which the heating is conducted, proportionately longer times being necessary at lower temperatures, and also varies to some extent with the composition of the glass. For example, while approximately 20 minutes at about 950° C. suffices to effect substantially maximum conversion of the glassy matrix to crystalline form in the case of composition No. 1, about one hour is necessary to bring about substantially the same result at about 800° C. for the same composition.

When the $Li_2O$ content is relatively high and the $SiO_2$ content is relatively low within the described ranges, the final body will contain both lithium metasilicate and lithium disilicate, because the amount of $SiO_2$ available in the composition after the initial formation of lithium metasilicate will not suffice to convert all of the metasilicate to the disilicate. However, lithium metasilicate may also remain in bodies containing sufficient $SiO_2$ for the complete conversion of the metasilicate to the disilicate, if the heat treatment is not hot enough and long enough for such complete conversion. In the latter case the amount of glassy matrix would be greater than after more complete heat treatment.

For example, articles composed of compositions 1, 2, 3, 7, 8, and 9, when heated 1 hour at 600° C., contained only lithium metasilicate crystals; when heated 40 minutes at 615° C., they also contained only litium metasilicate crystals; but, when raised from 520° C. to 600° C. in about 20 minutes and then heated 1 hour at 890° C., they were composed of lithium disilicate and quartz. These compositions are relatively high in $SiO_2$ and relatively low in $K_2O$ and $Al_2O_3$, and the lithium metasilicate is converted entirely to lithium disilicate in the final heat treatment and some quartz is also formed. The physical properties of the crystalline products differ substantially and surprisingly from those of the original glass. For example, a glass having the composition set forth in Example 7 has a thermal expansion coefficient of about $85 \times 10^{-7}$ per ° C., a flexural strength of about 12,000 p.s.i., and a Moh hardness of about 5. After being converted to a crystalline ceramic consisting essentially of the major proportion of lithium disilicate and a minor proportion of quartz by the aforesaid heat treatment, the physical properties of the final product are, thermal expansion coefficient about $100 \times 10^{-7}$ per ° C., flexural strength of about 34,500 p.s.i., and Moh hardness of about 7.

Compositions 4 and 10, after being heated one hour at 650° C. and one hour at 900° C., contain lithium metasilicate, lithium disilicate, and beta-spodumene. Although the $SiO_2$ content is not particularly high, the $Li_2O$ and $Al_2O_3$ were relatively high and the beta-spodumene and lithium disilicate were formed while some lithium metasilicate remained.

Compositions 5 and 6, when heated one hour at 750° C., contain only lithium metasilicate but, when such heat treatment was followed by heating one hour at 900° C., they contained only lithium disilicate and quartz. Relatively high $SiO_2$ content, the presence of $Na_2O$ and the absence of $K_2O$ resulted in the complete conversion of lithium metasilicate to lithium disilicate and the high $SiO_2$ content sufficed also to precipitate crystals of quartz.

The various crystals which may form in the articles resulting from the new method and their arrangement therein can impart various desirable properties thereto. Crystalline beta-spodumene has an extemely low or practically zero expansion coefficient. High-temperature or beta-quartz also has a low expansion coefficient. Articles containing substantial amounts of these crystals, therefore, have expansion coefficients lower than the original glass. Although lithium disilicate has an expansion coefficient greater than $100 \times 10^{-7}$ per ° C. and articles containing large amounts of it have expansion coefficients above that of the original glass, it particularly increases the tensile strength of the article on account of the interlocking of its crystals, which are tabular in shape.

Due to the fact that the process of this invention produces crystals which are very fine-grained and randomly oriented, so that they are closely knit and in interlocked relationship to each other, as a result of their being formed by the heterogeneous nucleation of the multitude of dissimilar nuclei dispersed throughout the article and grown in situ, the breaking strength of the instant ceramic product is 4 to 6 times greater than that of the original glass and compares very favorably with that of tempered glass articles having permanent uniform compressional stress in their surfaces. Unlike such tempered glass articles, however, surface abrasion merely lowers the strength of the present article but does not result in its disintegration; nor does any temperature short of its deformation temperature impair its strength, although the release of stress and the resultant weakening of a tempered glass article occurs well below its softening point. As indicative of the uniqueness of this ceramic product in this respect, flexural or bending strengths as high as 36,000 pounds per square inch have been measured on unabraded articles and as high as 20,000 pounds per square inch on abraded articles. By way of comparison, the flexural strength of the original untreated glass article in abraded condition is only on the order of 5,000 pounds per square inch. Moreover, the ceramic product is considerably harder than the original glass, the hardness being as high as 7.5 on the Moh hardness scale as compared to about 5.5 for the original glass. In addition, this ceramic product does not undergo any deformation below about 950° C. Also, even the articles with relatively high thermal expansion coefficients have on account of their unusually high mechanical strengths comparatively good thermal shock resistance. As a result of these latter characteristics, such crystalline ceramic product does not require annealing during cooling.

The electrical properties of this new ceramic product are also particularly favorable. Of special importance is the fact that such ceramic product possesses an unusually high electrical resistivity at room temperature and a relatively low power factor. By way of illustration, glass composition 7, which is typical of the present invention, has an electrical resistivity at 24° C. of about $5 \times 10^{11}$ ohm-cm., a power factor at 24° C. of .23% at 60 cycles and 1.5% at 1 megacycle, a dielectric constant at 24° C. of 9.75 at 60 cycles and 6.9 at 1 megacycle, and a power loss factor at 24° C. of 2.24 at 60 cycles and 0.10 at 1 megacycle. The crystalline ceramic obtained from such composition and referred to above has an electrical resistivity at 24° C. of about $3 \times 10^{16}$ ohm-cm., a power factor at 24° C. of 0.53% at 60 cycles and 0.27% at 1 megacycle, a dielectric constant at 24° C. of 5.5 at 60 cycles and 5.2 at 1 megacycle, and a power loss factor at 24° C. of 0.029 at 60 cycles and 0.014 at 1 megacycle.

Because of their unique properties, the crystalline ceramic bodies of the present invention find utility in a wide variety of applications. Being quite hard and strong, such bodies exhibit a very desirable degree of impact resistance and may be useful in the form of devices such as jewel bearings requiring resistance to mechanical shock. Moreover, because of their relatively high mechanical and flexural strengths, these compositions are suited for use as halftone and intaglio printing plates, and spinnerets for the extrusion of synthetic fibers, and the like. Again, by reason of their ability to be heated to temperatures as high as 950° C. without deformation, these ceramic bodies can be successfully employed in a variety of high-temperature applications, among which may be specifically mentioned laboratory ware for use at temperatures above the softening points of conventional glasses. Finally, because of their desirable electrical properties, the instant ceramic products can be used in the fabrication of printed circuits and a wide variety of other electrical and electronic devices.

What is claimed is:

1. The method of producing a ceramic article which comprises providing an article of photothermally opacifiable glass consisting essentially by weight of 60–85% $SiO_2$, 5.5%–15% $Li_2O$, 2–25% $Al_2O_3$, the ratio $Al_2O_3/Li_2O$ being less than about 1.7/1, and the indicated proportion of the photosensitive metal selected from the group consisting of about 0.001–0.03% of gold computed as Au, about 0.001–0.3% of silver computed as AgCl, and about 0.001–1% of copper computed as $Cu_2O$, the essential constituents totalling at least 90%, exposing substantially the entire article to short-wave radiations, heating the exposed article between the annealing and softening points of the glass for a time sufficient to opacify the glass by forming therein siliceous crystallites, including lithium metasilicate in an amount sufficient to provide a crystalline structure which is rigid enough to prevent distortion of the article upon heating to the softening temperature of the original glass, and finally heating the article to a temperature above the softening point of the original glass and above 800° C. but not above 950° C. to cause further crystallization, including conversion of lithium metasilicate to a lithium-containing silicate having a lower weight percentage of lithium.

2. The method of claim 1 in which the rigid structure is provided by first heating the article for at least 2 minutes between about 500° C. and 540° C. and further heating it to a higher temperature not exceeding the softening point of the original glass.

3. The method of claim 2 in which the further heating of the article is carried out at a temperature within about 50° C. of the softening point of the original glass.

4. The method of producing a ceramic article which comprises providing an article of photothermally opacifiable glass consisting essentially by weight of 60–85% $SiO_2$, the indicated proportion of an alkali metal oxide selected from the group consisting of 5.5–15% $Li_2O$, 0–4% $Na_2O$, 0–4% $K_2O$, the selected alkali metal oxide including at least 5.5% $Li_2O$, the total alkali metal oxide not exceeding 19%, 2–25% $Al_2O_3$, the ratio $Al_2O_3/Li_2O$ being less than 1.7/1, and the indicated proportion of the photosensitive metal selected from the group consisting of about 0.001–0.03% of gold computed as Au, about 0.001–0.3% of silver computed as AgCl, and about 0.001–1% of copper computed as $Cu_2O$, the above constituents totalling at least 94%, exposing substantially the entire article to shortwave radiations, heating the exposed article between the annealing and softening points of the glass for a time sufficient to opacify the glass by forming therein siliceous crystallites, including lithium metasilicate, in an amount sufficient to provide a crystalline structure which is rigid enough to prevent distortion of the article upon heating to the softening temperature of the original glass, and finally heating the article above the softening point of the original glass and above 800° C. but not above 950° C. to cause further crystallization, including conversion of lithium metasilicate to a lithium-containing silicate having a lower weight percentage of lithium.

5. The method of claim 4 in which the rigid structure is provided by first heating the article for at least 2 minutes between about 500° C. and 540° C. and further heating it to a higher temperature not exceeding the softening point of the original glass.

6. The method of claim 5 in which the further heating of the article is carried out at a temperature within about 50° C. of the softening point of the original glass.

7. The method of producing a ceramic article which comprises providing an article of photothermally opacifiable glass consisting essentially by weight of 75–85% $SiO_2$, the indicated proportion of an alkali metal oxide selected from the group consisting of 9–15% Li$_2$O, 0–4% Na$_2$O, 0–4% K$_2$O, the selected alkali metal oxide including at least 9% Li$_2$O, the total alkali metal oxides not exceeding 19%, 2–10% Al$_2$O$_3$, and the indicated proportion of the photosensitive metal selected from the group consisting of about 0.001–0.03% of gold computed as Au, about 0.001–0.3% of silver computed as AgCl, and about 0.001–1% of copper constituted as Cu$_2$O, the above constituents totalling at least 94%, exposing selected portions of the article in a predetermined pattern to short-wave radiations to form a latent image of said pattern in the glass, heating the exposed article between the annealing and softening points of the glass to convert the latent image to an opacified image comprising crystallites of lithium metasilicate while leaving the unexposed portions of the article clear and unopacified, treating the article with a dilute aqueous solution of hydrofluoric acid to dissolve the opacified image, then exposing substantially the entire article to short-wave radiations, heating the re-exposed article between the annealing and softening points of the glass for a time sufficient to opacify the glass by forming therein siliceous crystallites, including lithium metasilicate, in an amount sufficient to provide a crystalline structure which is rigid enough to prevent distortion of the article upon heating to the softening temperature of the original glass, and finally heating the article above the softening point of the original glass and above 800° C. but not above 950° C. to cause further crystallization.

8. The method of claim 7 in which the rigid structure is provided by first heating the re-exposed article for at least 2 minutes between 500° C. and 540° C. and further heating it to a higher temperature not exceeding the softening point of the original glass.

9. The method of claim 8 in which the further heating of the re-exposed article is carried out at a temperature within about 50° C. of the softening point of the original glass.

10. A ceramic body consisting essentially of a multiplicity of heterogeneously nucleated crystals dispersed in a glassy matrix, said crystals constituting the major portion of the body and consisting essentially of lithium disilicate and at least one other crystalline compound containing the SiO$_2$ radical, said crystals being crystallized in situ in said body from a glassy solution about submicroscopic nuclei of a photosensitive metal and said glassy matrix consisting of the uncrystallized portion of the glassy solution remaining after crystallization of said crystals.

11. The ceramic body as recited in claim 10 wherein one other compound containing the SiO$_2$ radical is beta-spodumene.

12. A ceramic body as recited in claim 10 wherein one other compound containing the SiO$_2$ radical is quartz.

13. A ceramic body as recited in claim 10 wherein one other compound containing the SiO$_2$ radical is lithium metasilicate.

14. A ceramic body as recited in claim 10 wherein said crystals consist of lithium disilicate, beta-spodumene, and lithium metasilicate.

15. A ceramic body as recited in claim 10 wherein said crystals consist of lithium disilicate, beta-spodumene, and quartz.

16. A ceramic body as recited in claim 10 wherein said photosensitive metal is gold.

17. A ceramic body as recited in claim 10 wherein said photosensitive metal is silver.

18. A ceramic body as recited in claim 10 wherein said photosensitive metal is copper.

19. A ceramic body consisting essentially of a multiplicity of heterogeneously nucleated crystals dispersed in a glassy matrix, said crystals constituting the major portion of the body, said crystals being crystallized in situ in said body from a glassy solution about dissimilar submicroscopic nuclei and said glassy matrix consisting of the uncrystallized portion of the glassy solution remaining after crystallization of said crystals.

20. A method of producing a ceramic article from an opacified glass article produced from a photosensitively opacifiable glass consisting essentially by weight of 60–85% SiO$_2$, 5.5–15% Li$_2$O, 2–25% Al$_2$O$_3$, the ratio Al$_2$O$_3$/Li$_2$O being less than about 1.7/1 and the indicated proportion of the photosensitive metal selected from the group consisting of about 0.001–0.03% of gold computed as Au, about 0.001–0.3% of silver computed as AgCl, and about 0.001–1% of copper computed as Cu$_2$O, the essential constituents totalling at least 90%, by exposing substantially the entire article to short-wave radiations, and heating the exposed article between the annealing and softening points of the glass for a time sufficient to opacify the glass by forming therein siliceous crystallites, including lithium metasilicate, said method comprising further heating the article in said temperature range for a sufficient time to provide a crystalline structure which is rigid enough to prevent distortion of the article upon heating to the softening temperature of the original glass, and finally heating the article above the softening point of the original glass and above 800° C. but not above 950° C. to cause further crystallization, including conversion of lithium metasilicate to a lithium-containing silicate having a lower weight percentage of lithium.

21. The method of claim 20 in which the rigid structure is provided by first heating the article for at least 2 minutes between about 500° C. and 540° C. and further heating it to a higher temperature not exceeding the softening point of the original glass.

22. The method of claim 21 in which the further heating of the article is carried out at a temperature within about 50° C. of the softening point of the glass.

23. A method of producing a ceramic article from an opacified glass article produced from a photosensitively opacifiable glass consisting essentially by weight of 60–85% SiO$_2$, the indicated proportion of an alkali metal oxide selected from the group consisting of 5.5–15% Li$_2$O, 0–4% Na$_2$O, 0–4% K$_2$O, the selected alkali metal oxide including at least 5.5% Li$_2$O, the total alkali metal oxide not exceeding 19%, 2–25% Al$_2$O$_3$, the ratio Al$_2$O$_3$/Li$_2$O being less than about 1.7/1, and the indicated proportion of the photosensitive metal selected from the group consisting of about 0.001–0.03% of gold computed as Au, about 0.001–0.3% of silver computed as AgCl, and about .001–1% of copper computed as Cu$_2$O, the above constituents totalling at least 94%, by exposing substantially the entire article to short-wave radiations, and heating the exposed article between the annealing and softening points of the glass for a time sufficient to opacify the glass by forming therein siliceous crystallites, including lithium metasilicate, said method comprising further heating the article in said temperature range for a sufficient time to provide a crystalline structure which is rigid enough to prevent distortion of the article upon heating to the softening temperature of the original glass, and finally heating the article above the softening point of the original glass and above 800° C. but not above 950° C. to cause further crystallization, including conversion of lithium metasilicate to a lithium-containing silicate having a lower weight percentage of lithium.

24. The method of claim 23 in which the rigid structure is provided by first heating the article for at least 2 minutes between about 500° C. and 540° C. and further heating it to a higher temperature not exceeding the softening point of the original glass.

25. The method of claim 24 in which the further heating of the article is carried out at a temperature within about 50° C. of the softening point of the glass.

26. A method of producing a ceramic article from an opacified glass article produced from a photosensitively opacifiable glass consisting essentially by weight of 75–85% SiO$_2$, the indicated proportion of an alkali metal oxide selected from the group consisting of 9–15% $Li_2O$, 0–4% $Na_2O$, 0–4% $K_2O$, the selected alkali metal oxide including at least 9% $Li_2O$, the total alkali metal oxides not exceeding 19%, 2–10% $Al_2O_3$, and the indicated proportion of the photosensitive metal selected from the group consisting of about 0.001–0.03% of gold computed as Au, about 0.001–0.3% of silver computed as AgCl, and about 0.001–1% of copper computed as $Cu_2O$, the above constitutents totalling at least 94%, by exposing substantially the entire article to short-wave radiations, and heating the exposed article between the annealing and softening points of the glass for a time sufficient to opacify the glass by forming therein siliceous crystallites, including lithium metasilicate, said method comprising further heating the article in said temperature range for a sufficient time to provide a crystalline structure which is rigid enough to prevent distortion of the article upon heating to the softening temperature of the original glass, and finally heating the article above the softening point of the original glass and above 800° C. but not above 950° C. to cause further crystallization, including conversion of lithium metasilicate to a lithium-containing silicate having a lower weight percentage of lithium.

27. The method of claim 26 in which the rigid structure is provided by first heating the article for at least 2 minutes between about 500° C. and 540° C. and further heating it to a higher temperature not exceeding the softening point of the original glass.

28. The method of claim 27 in which the further heating of the article is carried out at a temperature within about 50° C. of the softening point of the glass.

References Cited in the file of this patent

UNITED STATES PATENTS

| | | |
|---|---|---|
| 2,515,940 | Stookey | July 18, 1950 |
| 2,515,943 | Stookey | July 18, 1950 |
| 2,682,134 | Stookey | June 29, 1954 |
| 2,684,911 | Stookey | July 27, 1954 |